Nov. 3, 1964   E. A. MACHA ETAL   3,155,856
DYNAMOELECTRIC MACHINERY
Filed Nov. 14, 1960   2 Sheets-Sheet 2

WITNESSES
John E. Heagley, Jr.
Zigmund L. Jermer

INVENTORS
Edward A. Macha &
Oliver P. Steele III
BY
D. J. Smith
ATTORNEY

United States Patent Office 3,155,856
Patented Nov. 3, 1964

3,155,856
DYNAMOELECTRIC MACHINERY
Edward A. Macha, Monroeville, Pa., and Oliver P. Steele III, Canoga Park, Calif., assignors to Westinghouse Electric Corporation, East Pittsburgh, Pa., a corporation of Pennsylvania
Filed Nov. 14, 1960, Ser. No. 69,078
12 Claims. (Cl. 310—57)

The present invention is directed generally to dynamoelectric machinery and more particularly to new and improved cooling means for the stator and rotor thereof.

Under many operating conditions for dynamoelectric machinery a substantial amount of heat is developed in both the stator and rotor structures. This is particularly true when the stators are totally enclosed together with the rotor being disposed within an enclosure or can and the rotor being immersed in a high temperature medium. Both the rotor and stator have normally associated therewith, respectively, a maximum operating temperature which should not be exceeded. Under certain operating conditions the rotor runs at a higher temperature than that allowed in the stator so that heat is transmitted from the rotor toward the stator. Under other operating conditions the reverse situation exists viz., the stator operates at a higher temperature than that permitted in the rotor so that heat is transmitted from the stator toward the rotor.

Generally the stator of certain dynamoelectric machinery is of annular configuration and includes a plurality of circumferentially spaced axially extending end turns thereon. For those applications wherein the rotor operating temperature is higher than that permitted for operation of the stator, it is necessary to provide certain means for cooling the end turns of the stator. The cooling of the stator end turns is accomplished by this invention in a novel and efficient manner wherein a preferred heat flow path is provided adjacent the stator end turns to conduct the heat developed in the rotor along a path spaced from the stator end turns. In furtherance of this purpose a metallic member formed from a material having high thermal conductivity is disposed at a predetermined position adjacent the end turns of the stator. Where an enclosure or can is utilized in conjunction with the dynamoelectric machine the metallic member is disposed so that at least a portion thereof is contiguous to the rotor enclosure. To further aid in heat transfer, all of the voids of the stator adjacent the end turns may be filled by a suitable potting compound formed from insulating material having good heat transfer characteristics. The potting material is formed to act as a heat transfer medium from the end turns of the stator and from the rotor enclosure to the heat collecting members.

The preferred heat flow path of this invention is utilized also to remove heat from the end turns and to conduct such heat to a heat sink in a manner wherein the flow of such heat toward the rotor is prevented.

Accordingly, it is an object of this invention to provide a novel and efficient structure for cooling the stator end turns of a dynamoelectric machine.

Another object of this invention is to provide a new and improved structure for cooling the stator end turns of a dynamoelectric machine by setting up a preferred heat flow path adjacent the end turns.

Another object of this invention is to provide a new and improved cooling arrangement for the end turns of a stator through the use of heat collector rings disposed adjacent such end turns.

Still another object of this invention is to provide a new and improved stator end turn cooling arrangement wherein a potting compound and a heat collection ring are disposed adjacent each of the stator end turns.

A still further object of this invention is to provide a novel and efficient structure for cooling the end turns of a dynamoelectric machine having a sealed rotor wherein the rotor is subjected to temperature greater than the desired operating temperature for the stator end turns.

A still further object of this invention is to provide a novel and efficient structure for cooling the end turns of a dynamoelectric machine having a sealed rotor wherein the rotor is subjected to temperatures greater than the desired operating temperature for the stator end turns through the use of a heat collector ring disposed adjacent the stator end turns which forms a preferred heat flow path.

A still further object of this invention is to provide a novel and efficient structure for cooling the end turns of a dynamoelectric machine having a sealed rotor wherein the rotor is subjected to temperatures greater than the desired operating temperature for the stator end turns through the use of heat collector ring disposed adjacent the stator end turns which forms a preferred heat flow path together with a potting compound disposed in the voids located adjacent the stator end turns.

A further object of this invention is to remove heat from the stator end turns of a dynamoelectric machine along a path which by-passes the rotor thereof.

These and other objects of the instant invention will become more readily apparent upon review of a detailed description of an illustrative embodiment of this invention taken in conjunction with the accompanying illustrations in which.

The present embodiment of this invention is shown in conjunction with a "canned" motor wherein the rotor thereof is totally enclosed. With the rotor being enclosed, the hynamoelectric machine may be utilized in conjunction with a high temperature system wherein the rotor is immersed in a high temperature corrosive medium; yet such medium is not exposed to the stator to impair the operation of the dynamoelectric machine. In many applications for such canned dynamoelectric machinery it will be noted that the temperature of the rotor medium may be higher than that desired for operation of the stator. Thus heat will flow from the rotor enclosure outwardly toward the stator.

In still other applications of this invention it will be noted that the heat developed in the stator is higher than that desired for the end turns thereof. This invention provides a heat transfer medium which sets up a heat flow path adjacent the stator end turns and thereby remove heat from the stator end turns to lower the operating temperature thereof.

Figure 1:
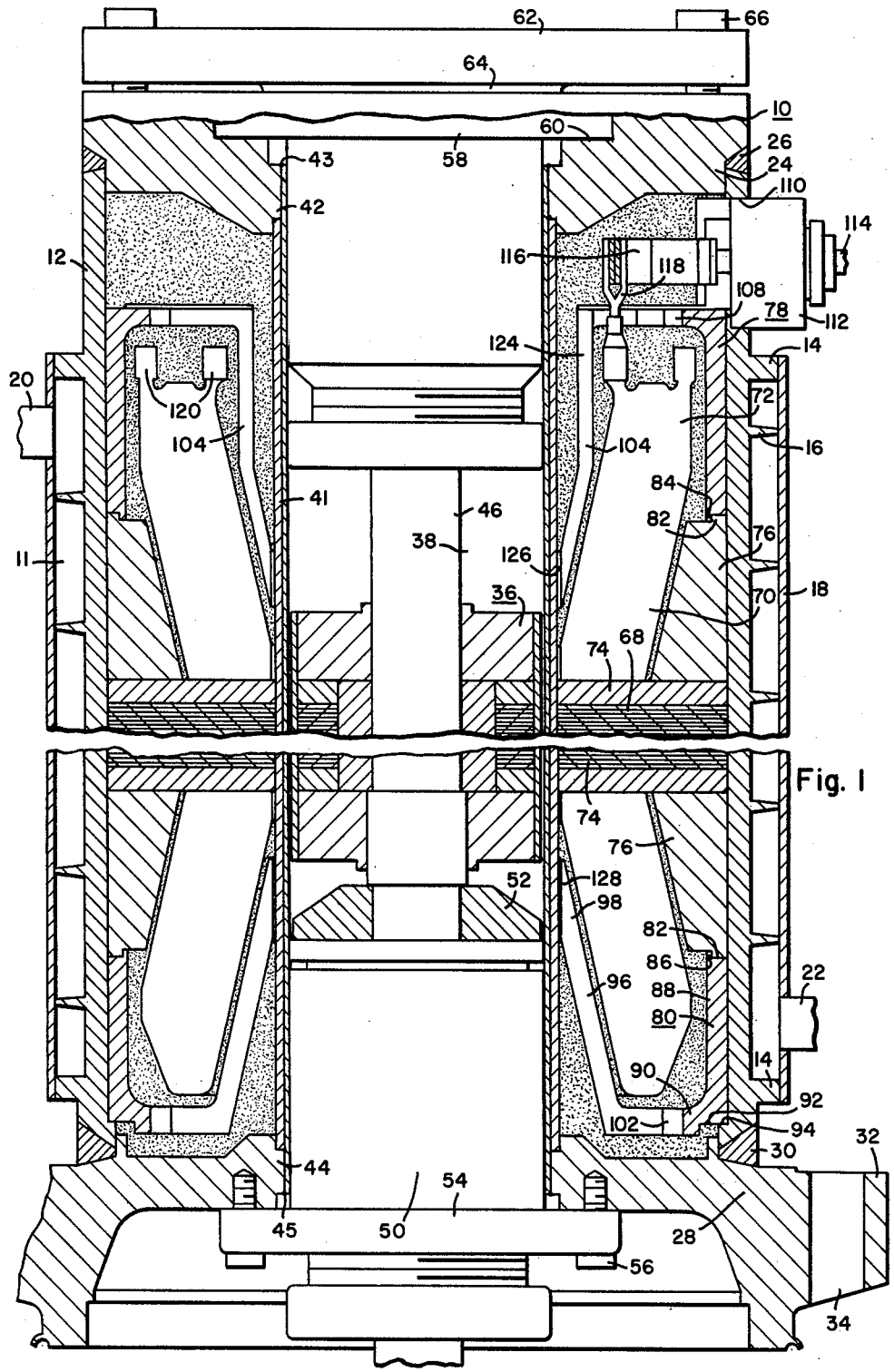
FIGURE 1 is a sectional view of a dynamoelectric machine constructed in accordance with the principles of the instant invention.
Figure 2:
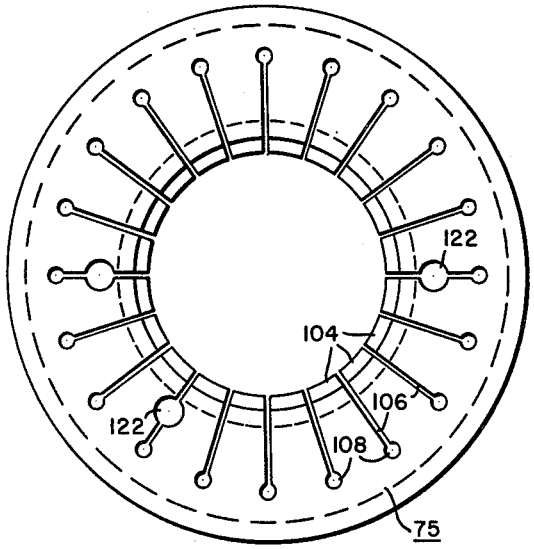
FIG. 2 is a view in end elevation of the upper heat collecting ring shown in FIGURE 1.
Figure 3:
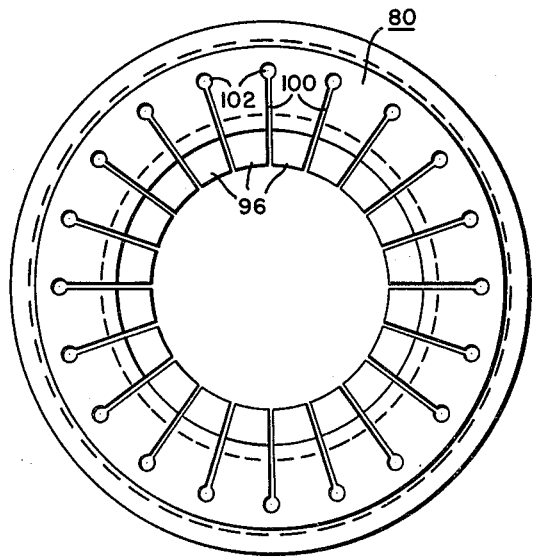
FIG. 3 is a view in end elevation of the lower collecting ring utilized in the apparatus illustrated in FIGURE 1.

Referring now more specifically to the drawings, there is illustrated in FIGURE 1 a dynamoelectric machine 10 having a tubular outer shell 12. The outer shell 12 is provided with a heat exchanger 11 formed by a pair of axially spaced, outwardly extending, annular projections 14 which may be formed integrally therewith, as illustrated, or may be secured thereto by suitable means as by welding. A spirally extending outward projection 16 is formed on the outward surface of the outer shell 12 between the axially spaced annular projection 14. The spiral projection may be formed integrally with the outer shell 12 or may be secured thereto by suitable means as by welding. A jacket 18 of tubular configuration is secured to the outward ends of the projections 14 and 16 to complete the heat exchanger 11 for the dynamoelectric machine 10. In furtherance of this purpose an inlet conduit 20 and an outlet conduit 22 are secured respectively to upper and lower portions of the jacket 18. In this manner a cooling fluid may be passed into the heat exchanger 11 through the inlet conduit 20 and the cooling medium will be circulated therethrough between adjacent portions of the spiral projection until it exits from the heat exchanger 11 through the outlet conduit 22.

The outer shell 12 is provided at its upper end with an annular end ring 24 secured thereto by suitable means as by an annular weld 26. The upper end ring 24 extends inwardly of the outer jacket 12 to enclose the upper end of the stator cavity 25 of the dynamoelectric machine. Similarly a stator flange 28 is secured to the lower end of the outer shell 12 as by a circumferential weld 30. The stator flange 28 is also of annular configuration and extends inwardly to enclose the lower end of the stator cavity 25. In addition, the stator flange 28 is provided with a plurality of circumferentially spaced axially extending openings 34 therein. The openings 34 are utilized to mount the dynamoelectric machine in position for operation in conjunction with any desired system passed by passing mounted bolts through the openings 34 for securing the machine in position.

The inward ends of the end ring and stator flange 24 and 28 respectively form a bore 38 within the dynamoelectric machine for receiving the rotor 36. The rotor bore 38 intermediate the end ring and stator flange 24 and 28 is defined by a tubular enclosure or can 40 and back up sleeve 41 which is utilized to absorb pressures to which the enclosure 40 may be subjected. The back up sleeve 41 is received respectively by opposed inwardly extending shoulders 42 and 44 formed in the inner surfaces of the upper and lower end plates 24 and 28 and secured thereto, as by welding. The enclosure 40 is sealingly secured to the end ring and stator flange 24 and 28 by conventional means as by welding at 43 and 45 respectively. The rotor 36 is secured to a shaft 46 by conventional means and is disposed to rotate within the bore 38.

Antifrictional means such as bearings 48 and 50 are coupled to the shaft 46 adjacent the upper and lower ends of the lower bore 38. The bearings 48 and 50 may be of any suitable design and do not form a part of the instant invention. For example, they may comprise sleeve bearings such as those shown and described in application Serial No. 637,210, filed January 30, 1957, by O. P. Steele, III, a coinventor of the instant invention and assigned to the present assignee. To prevent axial movement of the rotor relative to the stator of the dynamoelectric machine 10, suitable means such as a thrust runner 52 is coupled to the shaft 46. For a more specific example of an illustrative embodiment of the thrust runner 52, reference may again be had to the above-mentioned Steele application. The lower bearing 50 is secured to an annular support plate 54 which maintains the bearing 50 in position. The support plate 54 overlies a portion of the lower surface of the stator flange 28 and is secured thereto by suitable means such as by mounting bolts 56. Similarly an upper support plate 58 is secured to the upper bearing 48 by any conventional means. The upper support plate 58 is formed of a size to overlie a portion of the upper surface of the end ring 24 and is received in an upwardly facing shoulder 60 formed in the end ring 24.

A top cap 62 is provided to enclose the upper end of the stator bore 38 and is provided with a projection 64 thereon which engages the upper surface of the upper support plate 58. The top cap 62 and the end ring 24 are provided with aligned openings extending therethrough with the openings in the end ring 24 being threaded. A mounting bolt 66 extends through each of the aligned openings to fixedly locate the top cap 62 and the support plate 58 in position. For certain applications it is desirable to hermetically seal the rotor bore 38 and structures to accomplish the same are known in the art. For an example of a suitable structure, reference may be once more had to the above mentioned Steele application.

It is to be noted that the construction of the rotor 36 does not form a part of this invention and the rotor may be of any conventional design such as a squirrel cage rotor. A more specific example of a suitable rotor is included in the above-mentioned Steele application.

It is to be noted in addition that the lower bearing 50 is provided with a central bore extending therethrough which receives the lower end of the shaft 46. Accordingly, the lower end of the shaft 46 may be suitably coupled to any driven component which is operated by the dynamoelectric machine 10.

The annular stator cavity 25 is formed by the outer shell 12, the rotor enclosure 40 and the end ring and stator flange 24 and 28. The stator for the instant dynamoelectric machine may be formed from many conventional constructions and may include an iron core 68 which forms a plurality of axial winding slots (not shown). Axially extending windings 70 are circumferentially spaced within the stator cavity 25 having their end turns 72 extending axially outwardly from the upper and lower ends of the stator core 68. Disposed above and below the stator core 68 of the stator is a stator finger plate 74, which is disposed to compress the core 68 in a conventional manner not forming a part of the instant invention. Means are provided for removing heat from the end turns 70 of the stator windings as well as from the stator core 68. Such means include a pair of generally wedged shaped heat transfer rings 76 of annular configuration which engage the outwardly facing surfaces of the finger plates 74 respectively and which are disposed to engage a portion of the inner surface of the tubular outer shell 12. The heat transfer rings 76 are preferably formed from a material having excellent heat transfer characteristics such as a casting of copper. The heat removal means for the stator includes in addition an upper and a lower heat collector ring 78 and 80 respectively which are disposed in heat transfer relationship with the heat transfer rings 76 and which are shaped to conform closely to the shape of the end turns 72 of the stator. Each of the heat collector rings 78 and 80 which receives the adjacent end turns 72 is of an annular configuration having a generally U-shaped cross-section. The outward ends of the heat collector rings 76 are of stepped configuration at 82 with the adjacent ends of the heat collector rings 78 and 80 being of complementary stepped configuration at 84 and 86 respectively so that the heat collector rings 78 and 80 are mounted closely adjacent the heat transfer rings 76 respectively.

The outward side surface 88 of the lower heat collector ring 80 is of a generally tubular configuration and is provided at its lower end 90 with a shoulder 92 formed thereon which is received on a shoulder 94 formed adjacent the lower end of the tubular shell 12. A plurality of generally L-shaped fingers 96 extend inwardly and upwardly from the lower end 90 of the heat collector ring 80 to receive the adjacent end turns 72. Each of the fingers 96 is disposed closely adjacent the lower end turns 72 of the stator structure with the free ends 98 of the fingers 96 being disposed closely adjacent the rotor enclosure 40.

The fingers 96 are provided on the lower heat collecting ring 80 in order to provide a freedom of individual flexure of the fingers upon the subjecting of the fingers 96 to temperature variations in different portions of the ring 80. In furtherance of this purpose the slits 100 between adjacent fingers 96 are enlarged at the inward ends thereof as indicated by the reference character 102. The enlargements 102 permit greater freedom of individual flexure of the fingers 96.

Similarly, the upper heat collector ring 78 is provided with a plurality of inwardly and downwardly extending L-shaped fingers 104 which are divided by slits 106 therebetween. Each of the slits 106 terminate in an enlargement 108 which serves the same purpose as the enlargement 102 on the lower heat collecting ring 80.

Electrical contact is made with the upper portion end turns for the purpose of energizing the stator windings 70. In furtherance of this purpose an opening 110 is provided in the outer shell 12 of the dynamoelectric machine 10 which is disposed to receive a terminal box 112 of conventional configuration. Conduit means 114 are coupled to the terminal box 112 with the latter maintaining the conduit means in insulated relationship with respect to the shell 12. The conduit means 114 are coupled to a bus bar 116 disposed within the stator cavity 25 at a position between the upper heat collector ring 78 and the end ring 24. The bus bar 116 is coupled to a connector 118 which is disposed to frictionally engage the bus bar 116 and to frictionally engage one of the end turns 72 at the upper end thereof. To permit such frictional engagement with the connector 118, the end turns 72 are provided with a pair of spaced upstanding projections 120 on the upper ends thereof. Each of the connectors 118 is provided with a generally cup-shaped lower portion which fits over and frictionally engages one of the projections 120 on certain of the end turns 72.

It is to be noted that the connector 118 must pass through a portion of the upper heat collector ring 78. To permit the same, openings 122 are formed in the upper heat collector ring 78 intermediate a pair of adjacent fingers 104. In this manner the connector 118 is maintained in insulated relationship with the upper collector ring 78. Inasmuch as the upper end of the end turns 72 are shaped somewhat differently from the lower ends thereof for the purpose of accommodating the electrical connection of the connector 118, it is to be noted that the arms 124 of the fingers 104 are shaped somewhat differently from the corresponding arms of the fingers 96. Thus, the arms 104 extend vertically downwardly from the top of the heat collector ring 78 to a position adjacent a portion of the end turn 72 where the arms 104 are bent outwardly toward the enclosure 40.

As pointed out previously the heat collector rings 78 and 80 are provided to form a preferred heat flow path which by-passes the end turns 72 of the stator and which conducts heat away from the end turns 72. Thus, the heat collector rings 78 and 80 may be formed from any suitable material having a high thermal conductivity for example, a casting of copper. The heat collector rings 78 and 80 and the heat transfer rings 76 serve to remove heat from both the stator structure and the rotor bore independently of the temperature conditions to which the dynamoelectric machine 10 is subjected.

As pointed out in earlier portions of this specification, the dynamoelectric machine may be utilized in conjunction with a high temperature system wherein the rotor 36 is subjected to a high temperature medium. Under such circumstances the temperature in the rotor bore 38 may be higher than the desired operating temperature of the stator so that heat would flow from the rotor bore 38 toward the stator bore 25. The present invention does not permit this flow of heat to affect detrimentally the operation of the dynamoelectric machine 10. Heat flowing from the rotor bore 38 outwardly toward the stator will be conducted away from the end turns 72 of the stator by the heat collector rings 78 and 80 to a position adjacent the outer shell 12 of the machine 10. Inasmuch as the heat collector rings 78 and 80 are disposed in heat transfer relationship with the heat exchanger 11, this heat is then removed from the outer shell 12 by the cooling fluid which passes through the heat exchanger 11. In this manner excessive heating of the end turns by the high temperature medium located in the rotor bore 38 is prevented.

Operating conditions may also exist for the dynamoelectric machine 10 wherein the stator bore may be operated at a higher temperature than that desired in the rotor. Thus, heat would flow from the end turns 72 of the stator toward the rotor bore 38. The heat collector rings 78 are disposed to prevent the flow of heat toward the rotor bore 38 and will intercept such heat flow by providing a preferred heat flow path along the fingers 104 and 96 toward the outer shell 12 in the manner previously described. Similarly the heat transfer ring 76 absorbs some of the heat in the stator cavity 25. It is to be noted that the portions of the fingers 104 and 96 disposed adjacent the rotor enclosure 40 are formed so that clearances 126 and 128 respectively are provided. In this manner, the flow of heat from the heat collector rings 78 and 80 into the rotor bore 38 is prevented.

It will be noted in addition that under normal operating conditions it is desired to maintain the end turns 72 of the stator at the lowest possible temperature. The heat collector rings 78 and 80 and the heat transfer rings 76 also accomplish this purpose by conducting heat away from the end turns 72 with the heat being removed from the dynamoelectric machine 10 by the external heat exchanger.

If desired, in conjunction with the preferred heat flow path formed by the heat collector rings 78 and 80 and the heat transfer ring 76, an additional heat transfer medium may be provided within the stator cavity 25 for the purposes of effectively passing the heat flux to the preferred heat flow path. In furtherance of this purpose a suitable potting compound is utilized with the potting compound being disposed in all the voids existing within the stator cavity 25. The potting compound must of necessity be formed from an electrical insulating material but must have good heat transfer characteristics. Potting compounds of this type are commercially available and one example of a suitable potting compound is a solventless silicone resin having a filler of levigated alumina dispersed therewithin. An example of a commercially available silicone resin comprises resins numbered 7501 and 7521 sold commercially by the Dow-Corning Corporation.

For the purposes of this invention the potting compound is introduced to the stator cavity 25 in a free flowing form. In this manner all of the voids in the stator cavity 25 are filled by the potting compound. The potting compound is then subjected to heat treatment until it is solidified. A unitary stator structure having the potting compound in solid form is formed thereby.

As indicated previously each of the heat collector rings 78 and 80 is provided with individually movable fingers 104 and 96 respectively. Thus, severe stresses due to uneven heat flow through the heat collector rings 78 and 80 is prevented because each of the fingers of the heat collector rings is individually movable. Thus, fractures and breaking of portions of the heat collector rings 78 and 80 during operation of the dynamoelectric machine 10, which would result in an increase in the operating temperature of the stator, are substantially eliminated.

There has been described heretofore a novel and efficient structure for cooling the end turns and the rotor of a dynamoelectric machine. Numerous modifications may be made to the above described arrangement but such modifications would still remain within the broad spirit and scope of the invention. Accordingly, it is specifically intended that the specific embodiment described herein be interpreted in an illustrative, rather than in a limitive sense.

We claim as our invention:

1. In a dynamoelectric machine, a stator structure of annular configuration, a plurality of windings coupled to said stator structure forming a pair of groups of axially extending end turns, means for removing heat developed in said end turns including a pair of heat conducting members of generally annular configuration radially overlying the extremities of said end turn groups and disposed closely adjacent but axially spaced from said end turn groups, respectively, said heat conducting members having a plurality of radially extending slots formed therein to permit independent flexure of segments of said members and heat exchange means coupled to said heat conducting members.

2. In a dynamoelectric machine, an annular outer shell member, an annular stator structure disposed within said shell member, an annular closure disposed within the opening in said stator structure and forming a rotor bore, said stator structure including an upper and a lower group of circumferentially spaced axially extending end turns, said end turns being spaced from both said shell member and said enclosure, a heat conducting member disposed adjacent to but spaced from each of said end turn groups, each of said heat conducting members including an annulus disposed between said shell member and the adjacent end turns and engaging said shell member, each of said annuli including a plurality of individually movable, circumferentially spaced generally L-shaped fingers secured thereto and disposed to envelop the end surfaces and the inward surfaces of said end turns, said fingers each being mounted in spaced relationship with respect to said end turns and said enclosure, and heat exchange means coupled to said outer shell member in heat exchange relationship with respect to said annuli.

3. In a dynamoelectric machine, an annular outer shell member, an annular stator structure disposed within said shell member, an annular enclosure disposed within the opening in said stator structure and forming a rotor bore, said stator structure including an upper and a lower group of circumferentially spaced, axially extending end turns, said end turns being spaced from both said shell member and said enclosure, a heat conducting member disposed adjacent to but spaced from each of said end turn groups, each of said heat conducting members including an annulus disposed between said shell member and the adjacent end turns and engaging said shell member, each of said annuli including a plurality of individually movable circumferentially spaced generally L-shaped fingers secured thereto and disposed to envelop the end surfaces and the inward surfaces of said end turns, said fingers each being mounted in spaced relationship with respect to said end turns and said enclosure, a potting compound disposed in substantially all voids located in the space formed between said shell member and said enclosure, and heat exchange means coupled to said outer shell member in heat exchange relationship with respect to said annuli.

4. In a dynamoelectric machine, an annular outer shell member, an annular stator structure disposed within said shell member with the opening in said stator structure forming a rotor bore, said stator structure including an upper and a lower group of circumferentially spaced, axially extending end turns, said end turns being spaced from said shell member, a heat conducting member disposed adjacent to but spaced from each of said end turn groups, each of said heat conducting members including an annulus disposed between said shell member and the adjacent end turns and engaging said shell member, each of said annuli including a plurality of individually movable, circumferentially spaced generally L-shaped fingers secured thereto and disposed to envelop the end surfaces and the inward surfaces of said end turns, said fingers each being mounted in spaced relationship with respect to said end turns, and heat exchange means coupled to said outer shell member in heat exchange relationship with respect to said annuli.

5. In a dynamoelectric machine, a tubular shell member, a pair of end rings secured to said shell member, said shell member and said end rings defining an annular stator bore, an annular stator structure disposed within said stator bore with the opening in said stator structure forming a rotor bore, said stator structure including an upper and a lower group of circumferentially spaced, axially extending end turns, said end turns being radially spaced from said shell member and axially spaced from said end rings, a heat conducting member disposed adjacent to but spaced from each of said end turn groups, each of said heat conducting members including an annulus disposed between said shell member and the adjacent end turns and engaging said shell member, each of said annuli including at least one flexible extension secured thereto and disposed to envelop the end surface and the inward surface of at least one of said end turns, said extension extending radially in said stator bore at a position axially spaced with respect to said end turns and said end rings, respectively, and heat exchange means coupled to said shell member in heat exchange relationship with respect to said annuli.

6. In a dynamoelectric machine, an annular casing, an annular stator structure disposed within said casing, said stator structure including an upper and a lower group of circumferentially spaced, axially extending end turns, said end turns being spaced from said casing, heat conducting means disposed adjacent each of said end turn groups and formed to envelop the adjacent end turns, said heat conducting means each having a portion thereof axially spaced from the axial extremities of the adjacent end turns, said heat conducting means including a plurality of individually movable fingers, and heat exchange means coupled in heat exchange relationship with said heat conducting means.

7. In a dynamoelectric machine, housing means forming an annular stator space therein, an annular stator structure disposed within said stator space, said stator structure including an upper and a lower group of circumferentially spaced, axially extending end turns, means for removing heat developed in said end turns including a heat conducting member enveloping each of said end turn groups, said heat conducting members each having a portion thereof disposed closely adjacent but axially spaced from the axial extremities of the adjacent end turn group, respectively, each of said heat conducting members having a plurality of radially extending slots formed thereon to permit independent flexure of portions of said heat conductive members, heat exchange means coupled to said heat conducting members, and heat conductive electrical insulating material disposed between said end turn groups and said heat conducting members.

8. In a dynamoelectric machine, the combination comprising housing means forming an annular stator space and a rotor bore, said rotor bore being defined by a hermetically sealed enclosure which isolates said rotor bore from said stator space, an annular stator disposed in said stator space, said stator including a plurality of axially extending windings, heat exchange means coupled to said housing means for removing heat therefrom, and heat conductive means disposed within said stator space in heat exchange relationship with said heat exchange means and with said enclosure, said heat conductive means including a plurality of individually movable fingers extending laterally across said annular space at positions axially spaced from said windings.

9. In a dynamoelectric machine, the combination comprising housing means forming an annular stator space and a rotor bore, said rotor bore being defined by a hermetically sealed enclosure which isolates said rotor bore from said stator space, an annular stator disposed in said stator space, said stator including a plurality of axially extending windings, heat exchange means coupled to said housing means for removing heat therefrom, and heat conductive means disposed within said stator space in heat exchange relationship with said heat exchange means and with said enclosure, said heat conductive means including a plurality of individually movable fingers with the free ends of said fingers extending closely adjacent said closure, said fingers having portions thereof extending laterally across said annular space at positions axially spaced from said windings and heat conductive electrical insulative material disposed between said enclosure and said fingers.

10. In a dynamoelectric machine, an annular casing, a pair of end rings secured to the ends of said casing, said casing and said end ring defining an annular stator bore, an annular stator structure disposed within said stator bore, said stator structure including an upper and a lower group of circumferentially spaced, axially extending end turns, said end turns being radially spaced from said casing and axially spaced from said end rings, respectively, cantileverly mounted heat conducting means disposed adjacent each of said end turn groups and formed with the free ends thereof enveloping the adjacent end turns, said heat conducting means each having a portion thereof axially spaced from the adjacent end turn extremities and from the adjacent end ring and each having the free end thereof movable to prevent thermal shock caused by the heating of said heat conductive means by said end turns, and heat exchange means coupled in heat exchange relationship with said heat conducting means.

11. In a dynamoelectric machine, housing means forming an annular stator space therein, an annular stator structure disposed within said stator space, said stator structure including an upper and a lower group of circumferentially spaced, axially extending end turns, means for removing heat developed in said end turns including a heat conducting member enveloping each of said end turn groups, said heat conducting members being disposed closely adjacent but spaced from said end turn groups, respectively, said heat conducting members each having a portion axially spaced from the axial extremities of the adjacent end turn group and each having a plurality of radially extending slots formed thereon to permit independent flexure of portions of said heat conductive members, heat exchange means coupled to said heat conducting members, and a potting compound disposed in the voids located in said stator space.

12. In a dynamoelectric machine, the combination comprising tubular housing means forming an annular stator space and a rotor bore, a pair of axially spaced end rings secured to the ends of said housing means, a tubular enclosure extending between said end rings and hermetically secured thereto respectively, said rotor bore being defined by said hermetically sealed enclosure which isolates said rotor bore from said stator space, an annular stator disposed in said stator space, said stator including a plurality of axially extending windings, heat exchange means coupled to said housing means for removing heat therefrom, heat conductive means disposed within said stator space in heat exchange relationship with said heat exchange means and with said enclosure, said heat conductive means forming a heat flow path from said enclosure and from said windings to said heat exchange means, said heat conductive means being shaped to extend laterally across said annular stator space at positions axially spaced from said windings and from said end rings and said heat conductive means having a plurality of radial slots therein to permit independent flexure of portions thereof relative to the remainder thereof.

References Cited in the file of this patent
UNITED STATES PATENTS

| | | |
|---|---|---|
| 1,881,343 | Apple | Oct. 4, 1932 |
| 2,654,848 | Schaefer | Oct. 6, 1953 |
| 2,698,911 | Schaefer | Jan. 4, 1955 |
| 2,887,062 | Cametti | May 19, 1959 |

FOREIGN PATENTS

| | | |
|---|---|---|
| 442,205 | Great Britain | Feb. 4, 1936 |
| 971,240 | Germany | Dec. 31, 1958 |